United States Patent [19]
Payton

[11] Patent Number: 6,043,921
[45] Date of Patent: Mar. 28, 2000

[54] FADING-FREE OPTICAL PHASE RATE RECEIVER

[75] Inventor: Robert M. Payton, Portsmouth, R.I.

[73] Assignee: The United States of America as represented by the Secretary of the Navy, Washington, D.C.

[21] Appl. No.: 08/910,046

[22] Filed: Aug. 12, 1997

[51] Int. Cl.[7] .................................................. H04B 10/06
[52] U.S. Cl. ............................................. 359/191; 359/156
[58] Field of Search ..................................... 359/190, 111, 359/191, 189, 192, 162, 156; 350/349

[56] References Cited

U.S. PATENT DOCUMENTS 5,140,453  8/1992  Tsushima et al. .......................... 359/192

Primary Examiner—Kinfe-Michael Negash
Attorney, Agent, or Firm—Michael J. McGowan; Prithvi C. Lall; Michael F. Oglo

[57] ABSTRACT

A method and optical system for fading-free reception of optical phase signals having temporally varying polarization, phase and phase frequency is provided. Two orthogonally polarized local oscillators light waves of different frequencies are utilized to produce optical interference with an unknown polarization state optical input signal. Square law detection of the resultant optical interference yields a composite radio frequency signal which is decoded into four electronic outputs. These outputs are temporally differentiated and cross multiplied to produce a single composite output corresponding to the phase rate of the optical input signal. The total power of the four electronic outputs is proportional to the input signal power. The present invention thus maintains constant signal to noise ratios and avoids the use of internal clippers and limiters.

15 Claims, 8 Drawing Sheets

FADING-FREE OPTICAL PHASE RATE RECEIVER

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

(1) Field of the Invention

The present invention relates generally to optical phase signal reception. In particular, a method and device for reception of a polarization and phase varying optical phase signal without output power fade is provided.

(2) Description of the Prior Art

Devices for the reception of optical signals are well known in the prior art. Included in the prior art are devices which use photodetectors to provide an electric output signal proportional to the incident optical signal power. In many of these devices, fading due to variations in phase and polarization is avoided by incoherent optical detection. However, the elimination of polarization fading by incoherent detection comes at a cost. First, the strength of the output signal varies as the square of the input signal power. This variation means that for every decibel of input signal power lost in a receiver system, two decibels of receiver output current are lost. This square law characteristic has limited incoherent optical receivers in the prior art to dynamic ranges of less than 80 dB and optical detection noise floors to greater than −80 dBm (dB referenced to 1 milliwatt) per Hertz bandwidth. Moreover, the phase characteristics of the incident optical signal cannot be determined by this type of optical receiver.

Coherent optical receivers, on the other hand, remedy many of the problems of the earlier incoherent receivers. Typically, coherent optical receivers combine the input optical signal with a signal produced by a local oscillator to form an interference. The interference between the two optical waves produces an optical "beat" which can be used to measure the phase difference between the signal and the local oscillator. This "beat" is as a result of the square law nature of the optical detectors. The earliest coherent optical receivers, known in the art as homodyne. receivers, use a local oscillator with the same frequency as the input optical signal. This method allows the detection of the phase characteristics of the incoming signal; however, the output signal is subject to fading caused by either the phase or the polarity of the input signal. Later, heterodyne receivers were developed which used a local oscillator with a frequency different from that of the incoming signal to eliminate fading due to phase. Nevertheless, fading, due to polarization, remains a problem in the art.

Prior art phase detectors have relied upon the capabilities of the underlying optical receiver. These phase demodulation oriented optical receivers have historically been limited in two ways. First, the inability of the prior art to produce a phase and polarization fading-free receptor has caused the performance of prior art phase detectors to be sensitive to variations in phase and polarization of the input optical signal.

Additionally, prior art efforts have required constant output power to input power ratios—in order to achieve this, the output voltage is normally clipped or otherwise electronically limited. The use of these clippers or limiters in the prior art causes signal to noise ratios in the detector to vary over time.

No prior art methods or devices exist which provide phase and polarization fading-free demodulation of phase information while maintaining a constant, nontemporally-varying signal to noise ratio.

SUMMARY OF THE INVENTION

Accordingly, it is an object of the present invention to provide a method for demodulating the phase information from a coherent optical signal having temporal changes in phase and polarization.

It is a further object to provide an electro-optical system for phase and polarization fading-free reception of optical phase signals.

A still further object of the present invention is to provide reception of optical phase signals without clipping or limiting the output electronic voltages resulting from reception of the optical signal.

Yet another object of the invention is to provide a receiver output signal to noise ratio which is constant and non-temporally varying.

In accordance with these and other objects, the invention is, a method and optical device for providing fading-free, constant signal to noise ratio reception of optical phase signals having polarization and phase variations. The method includes (1) generating separate X and Y-polarized reference local oscillator light waves, each having a discrete frequency, (2) phase locking the two local oscillator light waves so that their polarizations are orthogonal to each other, (3) forming a composite local oscillator light wave by combining the two orthogonal local oscillator light waves, (4) receiving an external optical signal; (5) forming a new composite signal by combining the external signal with the phase-locked composite local oscillator; (6) converting the new composite signal to an equivalent electrical signal; (7) decoding the equivalent electrical signal into component voltages; and (8) temporally differentiating and cross multiplying the component voltages to generate a phase rate output.

The optical device is comprised of a heterodyne optical receiver with two coherent local light sources (such as highly coherent, phase locked lasers). It receives an external optical signal and forms an interference between the two local light sources and the external signal. Photodetectors are used to convert this optical interference into an electronic radio-frequency wave which can then be decoded into four outputs which fully describe the phase and polarization of the external optical signal. The four outputs are temporally differentiated and cross multiplied resulting in an output which is a linear combination of the phase rate and the signal polarization rotational angle.

BRIEF DESCRIPTION OF THE DRAWINGS

The foregoing objects and other advantages of the present invention will be more fully understood from the following detailed description and reference to the appended drawings wherein.

DESCRIPTION OF THE PREFERRED EMBODIMENTS

Figure 1:
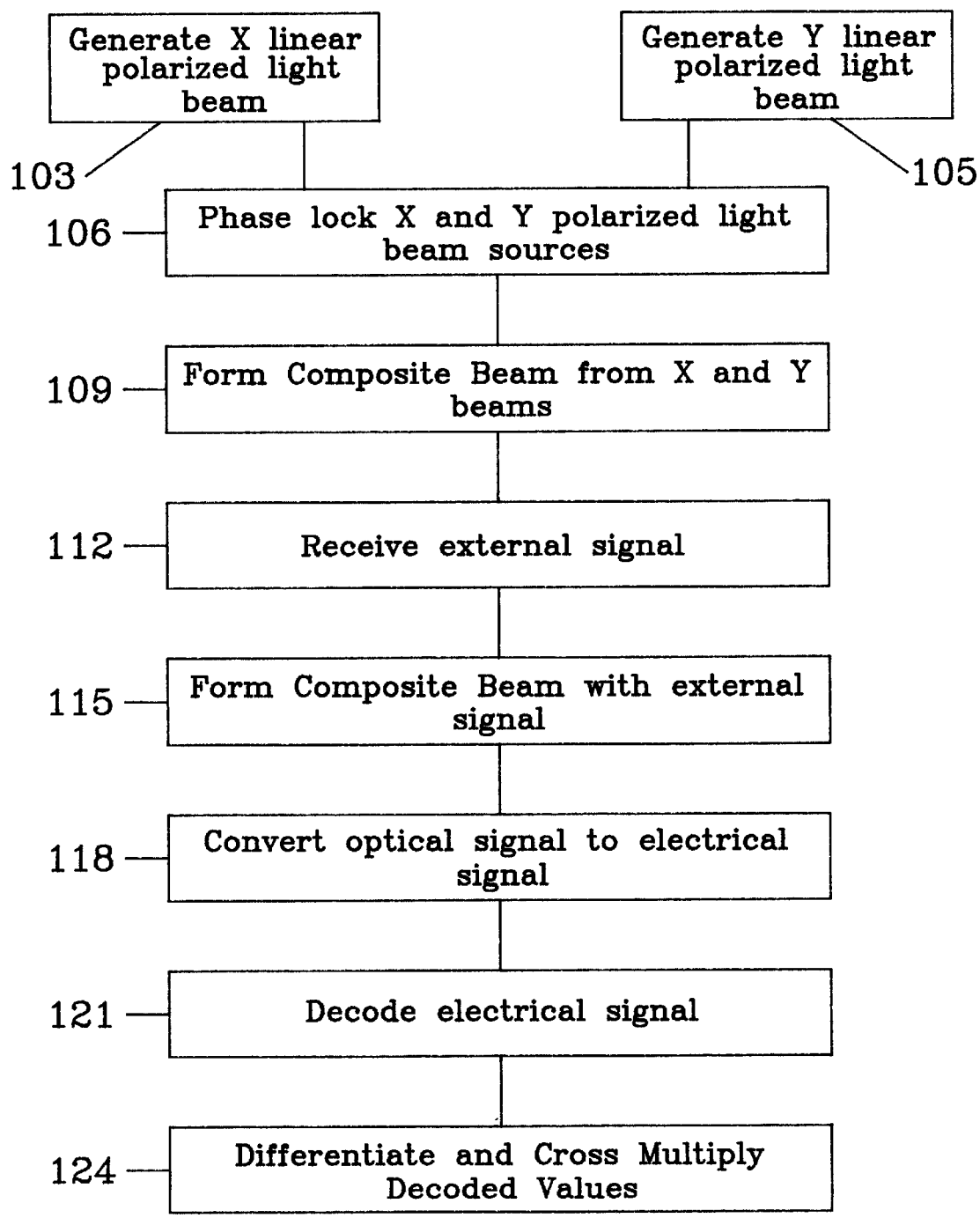
FIG. 1 is a process flow chart for the method of providing polarization and phase fading-free reception of optical phase signals.

Referring now to the drawings, and in particular to FIG. 1, a process flow chart for the method of providing polarity and phase fading-free reception of optical phase signals is shown. In order to mathematically quantify the limitations and operation of the method, several wave equations are used in the specification. The following table lists the names of the variables and a brief description of their use in the wave equations.

| | |
|---|---|
| $E_{LX,LY,S}$ | The wave amplitude of each of the optical signals LX = linearly X-polarized light wave LY = linarly Y-polarized light wave S = external optical signal |
| $\omega_{LX,LY,S}$ | The wave radian frequency of the optical signals; the frequencies of the linear X and the linear Y-polarized light beams are not equal to each other or the frequency of the external optical signal. |
| $\Delta\omega_{X,Y,XY}$ | The difference between the wave radian frequencies $\Delta\omega_Y = \omega_S - \omega_{LY}$ $\Delta\omega_X = \omega_S - \omega_{LX}$ $\Delta\omega_{XY} = \omega_{LX} - \omega_{LY}$ |
| $\theta_{LX,LY,S}$ | The spatial rotational angle of the optical signals, these are constant for the linearly X and Y-polarized light waves: $\theta_{LX} = 0 \quad \theta_{LY} = \frac{\pi}{2}$ |
| $\psi_{LX,LY,S}$ | The ellipticity angle of the optical signals, these are also constant for the linearly X and Y-polarized light waves: $\psi_{LX} = 0 \quad \psi_{LY} = 0$ $\psi_{LY} = 0$ |
| $\phi_{LX,LY,S}$ | The temporal phase of the optical signals |
| $\Delta\phi_{X,Y}$ | The offset of the linearly polarized signals phase from that of the incoming signal: $\Delta\phi_X = \phi_S - \phi_{LX} \quad \Delta\phi_Y = \phi_S - \phi_{LY}$ |
| $P_{LX,LY,S}$ | The electrical power of the optical signals |
| $P_{LXS,LYS,I}$ | The electrical power of the interferences, $P_{LXS}$ is the interference between the linearly X-polarized local light wave and the external optical signal, $P_{LYS}$ between the linearly Y-polarized local light wave and external optical signal, and $P_{LXLY}$ between the two linearly polarized local light waves |
| $V_{LX,LY,S}$ | The voltage output from a photoreceiver upon reception of the local oscillator light waves and the external optical signal |
| $V_{LXS,LYS,I}$ | The voltage output from a photoreceptor due to interference between the two linearly polarized local oscillator light waves and the external optical signal |
| $\eta$ | The impedance of the transmission media the optical signals propagate through |
| $R_L$ | The resistance loading the photodetector |
| $\Re$ | The responsivity of the photodetector |
| $A$ | The amplification of the input signal |
| $A_{X,Y}$ | The amplification of the linearly X and Y-polarized signals |
| $t$ | Time; for temporally varying variables |

In FIG. 1, the process for receiving a temporally varying frequency, phase and polarization optical phase signal with a constant signal to noise ratio is illustrated. In particular, in step 103, a local oscillator is used to generate a first distinct frequency light wave linearly polarized in the X direction and mathematically described as:

$$\overline{E}_{LX}(t) = \begin{bmatrix} E_{LX}\cos(\omega_{LX}t + \phi_{LX}) \\ 0 \end{bmatrix} \quad (1)$$

In step 105, a second local oscillator is used to generate a second distinct frequency linearly Y-polarized light wave, which is mathematically described as:

$$\overline{E}_{LY}(t) = \begin{bmatrix} 0 \\ E_{LY}\cos(\omega_{LY}t + \phi_{LY}) \end{bmatrix} \quad (2)$$

The two light waves are used in step 106 to phase lock the local oscillators. In particular, the radian frequencies and phases of the two phase locked spatially orthogonal optical local oscillator signals comprise a set of component light waves which are compared to each other. The local oscillators are adjusted until the relation $$\omega_{LX} - \omega_{LY} = \Delta\omega_{XY} \quad (3)$$

holds true. In this way, the radian frequencies of both oscillators are held such that each significantly exceeds the bandwidth of the incoming optical signal.

These two optical signals are then combined into a composite optical signal in step 109. The heterodyne cross interference of these two signals is zero because they have orthogonal polarization, thus:

$$v_{LXLY}(t) = \frac{AR_L\Re}{\eta}\langle 2\overline{E}_{LX}(t) \cdot \overline{E}_{LY}(t)\rangle = 0 \quad (4)$$

In step 112, the incident optical signal is received. Since the optical signal is arbitrary, it has unknown, and possibly temporally variant values for the wave amplitude $E_S$, the rotational angle of the wave temporally $\theta_S$ phase$_s$, the ellipticity angle $\psi_S$, and the wave radian frequency $\omega_S$. Further, the incident optical signal is mathematically described as:

$$\overline{E}_S(t) = \quad (5)$$

$$E_S(t)\begin{bmatrix}\cos(\theta_S) & \sin(\theta_S)\\ -\sin(\theta_S) & \cos(\theta_S)\end{bmatrix}\begin{bmatrix}\cos(\psi_S) & 0\\ 0 & \sin(\psi_S)\end{bmatrix}\begin{bmatrix}\cos(\phi_S) & -\sin(\phi_S)\\ \sin(\phi_S) & \cos(\phi_S)\end{bmatrix}\begin{bmatrix}\cos(\omega_S t)\\ \sin(\omega_S t)\end{bmatrix}$$

This incident signal is combined with the composite optical signal formed in step 109 to form a composite input optical signal in step 115. The resultant signal is converted to an electrical signal by a photoreceiver in step 118. The output from the photoreceiver is a linear combination of several electrical power values as described in the following equation:

$$v_{out} = AR_L R(P_{LX}(t) + P_{LY}(t) + P_S(t) + P_{LXS}(t) + P_{LYS}(t) + P_{LXLY}(t)) \quad (6)$$

or equivalently, in terms of the photoreceptor output voltages:

$$v_{out} = v_{LX}(t) + v_{LY}(t) + v_S(t) + v_{LXS}(t) + v_{LYS}(t) + v_{LXLY}(t) \quad (7)$$

In particular, the baseband homodyne self-interference outputs are:

$$v_{LX}(t) = \frac{AR_L R}{\eta}\langle \overline{E}_{LX}(t)\cdot\overline{E}_{LX}(t)\rangle = \frac{AR_L R E_{LX}^2}{2\eta} = AR_L R P_{LX} \quad (8)$$

$$v_{LY}(t) = \frac{AR_L R}{\eta}\langle \overline{E}_{LY}(t)\cdot\overline{E}_{LY}(t)\rangle = \frac{AR_L R E_{LY}^2}{2\eta} = AR_L R P_{LY} \quad (9)$$

Due to the orthogonal nature of the local oscillator signals, the cross interference between them $v_{(LXLY)}$ is zero. The final two terms of the photoreceptor output represent the cross interference between the incident signal and the two local oscillator signals. These terms are described mathematically as:

$$v_{LXS}(t) = \frac{AR_L R}{\eta} E_{LX} E_S(t)[\cos(\theta_S)\cos(\psi_S)\cos(\Delta\omega_X t + \Delta\phi_X) + \sin(\theta_S)\sin(\psi_S)\sin(\Delta\omega_X t + \Delta\phi_X)] \quad (11)$$

$$v_{LYS}(t) = \frac{AR_L R}{\eta} E_{LY} E_S(t)[-\sin(\theta_S)\cos(\psi_S)\cos(\Delta\omega_Y t + \Delta\phi_Y) + \cos(\theta_S)\sin(\psi_S)\sin(\Delta\omega_Y t + \Delta\phi_Y)] \quad (12)$$

or alternatively, using optical power terms as:

$$v_{LXS}(t) = 2AR_L R\sqrt{P_{LX} P_S(t)}\,[\cos(\theta_S)\cos(\psi_S)\cos(\Delta\omega_X t + \Delta\phi_X) + \sin(\theta_S)\sin(\psi_S)\sin(\Delta\omega_X + \Delta\phi_X)] \quad (13)$$

$$v_{LYS}(t) = 2AR_L R\sqrt{P_{LY} P_S(t)}\,[-\sin(\theta_S)\cos(\psi_S)\cos(\Delta\omega_Y t + \Delta\phi_Y) + \cos(\theta_S)\sin(\psi_S)\sin(\Delta\omega_Y t + \Delta\phi_Y)] \quad (14)$$

In step 121, the photoreceptor output is demodulated and decoded into four further outputs: $V_{XI}$, $V_{XQ}$, $V_{YI}$, and $V_{YQ}$. These four outputs are described mathematically as:

$$v_{XI}(t) = \langle v_{out}(t)\cos(\Delta\omega_x t)\rangle \frac{A_X AR_L R}{2\eta} E_{LX} E_S(t)[\cos(\theta_S)\cos(\psi_S)\cos(\Delta\phi_X) + \sin(\theta_S)\sin(\psi_S)\sin(\Delta\phi_X)] \quad (15)$$

$$v_{XQ}(t) = \langle v_{out}(t)\sin(\Delta\omega_x t)\rangle \frac{A_X AR_L R}{2\eta} E_{LX} E_S(t)[\sin(\theta_S)\sin(\psi_S)\cos(\Delta\phi_X) - \cos(\theta_S)\cos(\psi_S)\sin(\Delta\phi_X)] \quad (16)$$

$$v_{YI}(t) = \langle v_{out}(t)\cos(\Delta\omega_x t)\rangle \frac{A_Y AR_L R}{2\eta} E_{LY} E_S(t)[-\sin(\theta_S)\cos(\psi_S)\cos(\Delta\phi_Y)\cos(\theta_S)\sin(\psi_S)\sin(\Delta\phi_Y)] \quad (17)$$

$$\frac{v_{YQ}(t) = \langle v_{out}(t)\sin(\Delta\omega_y t)\rangle A_X AR_L R}{2\eta} E_{LY} E_S(t)[\cos(\theta_S)\sin(\psi_S)\cos(\Delta\phi_Y) + \sin(\theta_S)\cos(\psi_S)\sin(\Delta\phi_Y)] \quad (18)$$

or alternatively, in terms of optical power:

$$v_{XI}(t) = A_X AR_L R\sqrt{P_{LX} P_S(t)}\,[\cos(\theta_S)\cos(\psi_S)\cos(\Delta\phi_X) + \sin(\theta_S)\sin(\psi_S)\sin(\Delta\phi_X)] \quad (19)$$

$$v_{XQ}(t) = A_X AR_L R\sqrt{P_{LX} P_S(t)}\,[\sin(\theta_S)\sin(\psi_S)\cos(\Delta\phi_X) + \cos(\theta_S)\cos(\psi_S)\sin(\Delta\phi_X)] \quad (20)$$

$$v_{YI}(t) = A_Y AR_L R\sqrt{P_{LY} P_S(t)}\,[-\sin(\theta_S)\cos(\psi_S)\cos(\Delta\phi_Y) + \cos(\theta_S)\sin(\psi_S)\sin(\Delta\phi_Y)] \quad (21)$$

$$v_{YQ}(t) = A_Y AR_L R\sqrt{P_{LY} P_S(t)}\,[\cos(\theta_S)\sin(\psi_S)\cos(\Delta\phi_Y) + \sin(\theta_S)\cos(\psi_S)\sin(\Delta\phi_Y)] \quad (22)$$

-continued $$v_S(t) = \frac{AR_L R}{\eta}\langle \overline{E}_S(t)\cdot\overline{E}_S(t)\rangle = \frac{AR_L R E_S^2}{2\eta} = AR_L R P_S(t) \quad (10)$$

Since $A_Y$ and $A_X$ are selected (during steps 103 and 105) when the local oscillator signals are generated such that:

$$A_X = A_Y \frac{E_{LY}}{E_{LX}} = A_Y \sqrt{\frac{P_{LY}}{P_{LX}}} \quad (23)$$

a coefficient based on this relationship and the common multipliers in the output voltages can be derived as follows:

$$\mu_0 = \frac{A_X A R_L R}{2\eta} E_{LX} = \frac{A_Y A R_L R}{2\eta} E_{LY} \quad (24)$$

The four equations for the outputs from the photoreceptor can thus be simplified as follows:

$$v_{XI}(t) = \mu_0 E_S(t)[\cos(\theta_S)\cos(\psi_S)\cos(\Delta\phi_X) + \sin(\theta_S)\sin(\psi_S)\sin(\Delta\phi_X)] \quad (25)$$

$$v_{XQ}(t) = \mu_0 E_S(t)[\sin(\theta_S)\sin(\psi_S)\cos(\Delta\phi_X) - \cos(\theta_S)\cos(\psi_S)\sin(\Delta\phi_X)] \quad (26)$$

$$v_{YI}(t) = \mu_0 E_S(t)[-\sin(\theta_S)\cos(\psi_S)\cos(\Delta\phi_Y) + \cos(\theta_S)\sin(\psi_S)\sin(\Delta\phi_Y)] \quad (27)$$

$$v_{YQ}(t) = \mu_0 E_S(t)[\cos(\theta_S)\sin(\psi_S)\cos(\Delta\phi_Y) + \sin(\theta_S)\cos(\psi_S)\sin(\Delta\phi_Y)] \quad (28)$$

The sum of the power of these four outputs, that is:
$$P = V_{XI}^2(t) + V_{XQ}^2(t) + V_{YI}^2(t) + V_{YQ}^2(t) = \mu_0 E_S^2(t) = 2\eta \mu_O^2 P_s(t) \quad (29)$$
is stabilized so that the instantaneous power is directly proportional to the power of the external optical signal. As long as the power of the external optical signal is non-zero, the output power from the decoding step 121 is non-zero, effectively eliminating fade due to changes in polarization, phase or frequency.

Finally, in step 124, the output voltages from decoding step 121 are differentiated and cross multiplied to generate a single output which is a linear combination of the external optical signal's phase rate and polarization rotational angle.

In order to generate the synthesized phase rate output, the four outputs from decoding step 121 are first temporally differentiated, thus:

$$\frac{d}{dt}V_{XI} = \begin{bmatrix} +\mu_0[\cos(\theta_s)\cos(\psi_s)\cos(\Delta\phi_x) + \sin(\theta_s)\sin(\psi_s)\sin(\Delta\phi_x)]\frac{d}{dt}E_s(t) \\ +\mu_0 E_s(t)[-\cos(\theta_s)\cos(\psi_s)\sin(\Delta\phi_x) + \sin(\theta_s)\sin(\psi_s)\cos(\Delta\phi_x)]\frac{d}{dt}\Delta\phi_x \\ +\mu_0 E_s(t)[-\sin(\theta_s)\cos(\psi_s)\cos(\Delta\phi_x) + \cos(\theta_s)\sin(\psi_s)\sin(\delta\phi_x)]\frac{d}{dt}\theta_s \\ +\mu_0 E_s(t)[-\cos(\theta_s)\sin(\psi_s)\cos(\Delta\phi_x) + \sin(\theta_s)\cos(\psi_s)\sin(\Delta\phi_x)]\frac{d}{dt}\psi_s \end{bmatrix} \quad (30)$$

$$\frac{d}{dt}V_{XQ} = \begin{bmatrix} +\mu_0[\sin(\theta_s)\sin(\psi_s)\cos(\Delta\phi_x) - \cos(\theta_s)\cos(\psi_s)\sin(\Delta\phi_x)]\frac{d}{dt}E_s(t) \\ +\mu_0 E_s(t)[-\sin(\theta_s)\sin(\psi_s)\sin(\Delta\phi_x) - \cos(\theta_s)\cos(\psi_s)\cos(\Delta\phi_x)]\frac{d}{dt}\Delta\phi_x \\ +\mu_0 E_s(t)[\cos(\theta_s)\sin(\psi_s)\cos(\Delta\phi_x) + \sin(\theta_s)\cos(\psi_s)\sin(\Delta\phi_x)]\frac{d}{dt}\theta_s \\ +\mu_0 E_s(t)[\sin(\theta_s)\cos(\psi_s)\cos(\Delta\phi_x) + \cos(\theta_s)\sin(\psi_s)\sin(\Delta\phi_x)]\frac{d}{dt}\psi_s \end{bmatrix} \quad (31)$$

$$\frac{d}{dt}V_{YI} = \begin{bmatrix} +\mu_0[-\sin(\theta_s)\cos(\psi_s)\cos(\Delta\phi_Y) + \cos(\theta_s)\sin(\psi_s)\sin(\Delta\phi_Y)]\frac{d}{dt}E_s(t) \\ +\mu_0 E_s(t)[\sin(\theta_s)\cos(\psi_s)\sin(\Delta\phi_Y) + \cos(\theta_s)\sin(\psi_s)\cos(\Delta\phi_Y)]\frac{d}{dt}\Delta\phi_Y \\ +\mu_0 E_s(t)[-\cos(\theta_s)\cos(\psi_s)\cos(\Delta\phi_Y) - \sin(\theta_s)\sin(\psi_s)\sin(\Delta\phi_Y)]\frac{d}{dt}\theta_s \\ +\mu_0 E_s(t)[\sin(\theta_s)\sin(\psi_s)\cos(\Delta\phi_Y) + \cos(\theta_s)\cos(\psi_s)\sin(\Delta\phi_Y)]\frac{d}{dt}\psi_s \end{bmatrix} \quad (32)$$

$$\frac{d}{dt}V_{YQ} = \begin{bmatrix} +\mu_0[\cos(\theta_s)\sin(\psi_s)\cos(\Delta\phi_Y) + din(\theta_s)\cos(\psi_s)\sin(\Delta\phi_Y)]\frac{d}{dt}E_s(t) \\ +\mu_0 E_s(t)[-\cos(\theta_s)\sin(\psi_s)\sin(\Delta\phi_Y) + \sin(\theta_s)\cos(\psi_s)\cos(\Delta\phi_Y)]\frac{d}{dt}\Delta\phi_Y \\ +\mu_0 E_s(t)[-\sin(\theta_s)\sin(\psi_s)\cos(\Delta\phi_Y) + \cos(\theta_s)\cos(\psi_s)\sin(\Delta\phi_Y)]\frac{d}{dt}\theta_s \\ +\mu_0 E_s(t)[\cos(\theta_s)\cos(\psi_s)\cos(\Delta\phi_Y) - \sin(\theta_s)\sin(\psi_s)\sin(\Delta\phi_Y)]\frac{d}{dt}\psi_s \end{bmatrix} \quad (33)$$

The terms are then combined into two differentiated and cross multiplied voltages, corresponding to the linearly X and Y-polarized inputs which generated them:

$$V_{XDCM} = V_{XQ}\frac{d}{dt}(V_{XI}) - V_{XI}\frac{d}{dt}(V_{XQ}) \quad (34)$$

$$V_{YDCM} = V_{YQ}\frac{d}{dt}(V_{\Xi}) - V_{YI}\frac{d}{dt}(V_{XI}) \quad (35)$$

Substitution yields:

$$V_{XDCM} = \mu_0^2 E_s^2(t) \begin{pmatrix} [\cos^2(\theta_s)\cos^2(\psi_s) + \sin^2(\psi_s)]\frac{d}{dt}\Delta\phi_x + \\ -\cos(\psi_s)\sin(\psi_s)\frac{d}{dt}\theta_s - \cos(\theta_s)\sin(\theta_s)\frac{d}{dt}\psi_s \end{pmatrix} \quad (36)$$

$$V_{YDCM} = \mu_0^2 E_s^2(t) \begin{pmatrix} [\cos^2(\theta_s)\sin^2(\psi_s) + \sin^2(\theta_s)\cos^2(\psi_s)]\frac{d}{dt}\Delta\phi_Y + \\ -\cos(\psi_s)\sin(\psi_s)\frac{d}{dt}\theta_s - \cos(\theta_s)\sin(\theta_s)\frac{d}{dt}\psi_s \end{pmatrix} \quad (37)$$

These two component electronic signals can then be combined to generate a polarization fading-free phase rate signal $V_{DCM}$:

$$V_{DCM}(t) = V_{YQ}\frac{d}{dt}(V_{YI}) - V_{YI}\frac{d}{dt}(V_{YQ}) + V_{XQ}\frac{d}{dt}(V_{\Xi}) - V_{\Xi}\frac{d}{dt}(V_{XQ}) = \quad (38)$$

$$V_{YDCM} + V_{XDCM}$$

$$V_{DCM}(t) = \mu_0^2 E_s^2(t)\left[\frac{d}{dt}\Delta\phi - 2\cos(\psi_s)\sin(\psi_s)\frac{d}{dt}(\theta_s)\right] \quad (39)$$

$$V_{DCM}(t) = \mu_0^2 E_s^2(t)\left[\frac{d}{dt}\Delta\phi - \sin(2\psi_s)\frac{d}{dt}(\theta_s)\right] \quad (40)$$

If the signal polarization angle ($\theta_s$) is temporally constant, then the synthesized output signal ($V_{DCM}$) will contain only the phase rate. If the rotational angle varies, then the system output signal will contain a polarization noise component. However, because the noise component is additive, many signal processing methods exist for handling this type of noise condition.

Before discussing various figures (FIGS. 2–6), it is instructive to note various blocks therein are designated by respective designated numerals and respective descriptors obtained by using capital letter for each word in each descriptor.

Figure 2:
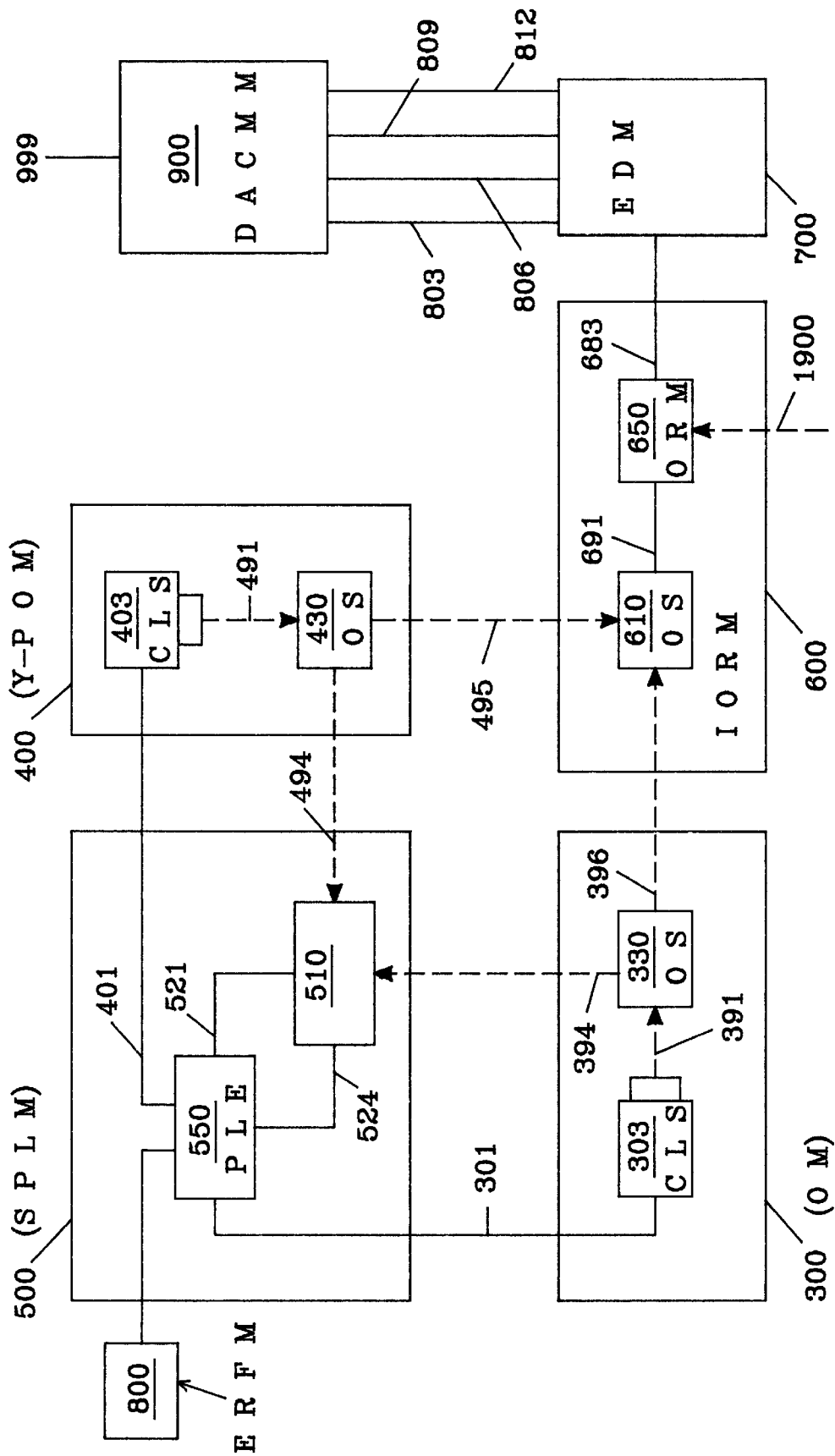
FIG. 2 is a high level block diagram of one embodiment of the apparatus for polarization and phase fading-free reception of optical phase signals.

Referring now to FIG. 2, one embodiment of the optical device implementing the present invention's method for phase and polarization fading-free reception is shown. The device consists of X-polarized local oscillator lightwave generating module 300 (also designated as "OM"), Y-polarized local oscillator lightwave generating module 400 (also designated as "Y-POM"), local oscillator signal phase locking module 500 (also designated as "SPLM"), incoming optical receiver module 600 (also designated as "IORM"), electronic decoding module 700 (also designated as "EDM"), electronic radio-frequency oscillator 800 (also designated as "ERFM"), and differentiation and cross multiplication module 900 (also designated as "DACMM").

Coherent light source 303 (also designated as "CLS") generates linearly Y-polarized light beam 391. Light beam 391 passes through optics 330 (also designated as "OS") and forms light beam 394. At the same time, linearly Y-polarized light beam 491 is also generated by coherent light source 403 (also designated as "CLS") and passes through optics 430, forming light beam 494.

Resulting light beams 394 and 494, both linearly polarized in the Y direction from optics 330 and 430 (also designated as "OS"), are directed into optics 510. Optics 510 combines the two signals into one interference which is detected and converted into electrical signals carried by wires 521 and 524 into phase locking electronics 550 (also designated as "PLE"). Phase locking electronics 550 compares the phase and polarization of the resulting interference and adjusts the phase and polarization characteristics of coherent light sources 303 and 403 (also designated as "CLS") through control channels 301 and 401 setting the phase relationship such that the difference in phase between the two signals is exactly the same as the phase of the reference radio frequency oscillator 800 (also designated as "ERFM") and is also locked close to the frequency of the incoming optical signal.

Linearly Y-polarized light beam 391 is also rotated by optics 330 (also designated as "OS") forming linearly X-polarized light beam 396. Linearly X-polarized beam 396 and linearly Y-polarized light beam 495 are propagated from optics 330 and 430 into optics 610 (also designated as "OS"), where they are combined to form local composite light beam 691. Optical receiver module 650 (also designated as "ORM") combines local composite light beam 691 with external optical signal 1900 to form a composite optical beam. The composite optical beam is interfered and converted into a single channel electronic radio frequency signal which is carried across wire 683 to electronic decoding module 700 (also designated as "EON"). There, the channel is broken into four separate stabilized voltage output channels 803, 806, 809, and 812 which represent $V_{XI}$, $V_{XQ}$, $V_{YI}$, and $V_{YQ}$.

Voltage output channels 803, 806, 809, and 812 connect to differentiation and cross multiplication module 900 which temporally differentiates the voltages and combines them to yield synthesized phase rate output 999. Synthesized phase rate output 999 corresponds to ($V_{DCM}$).

Figure 3:
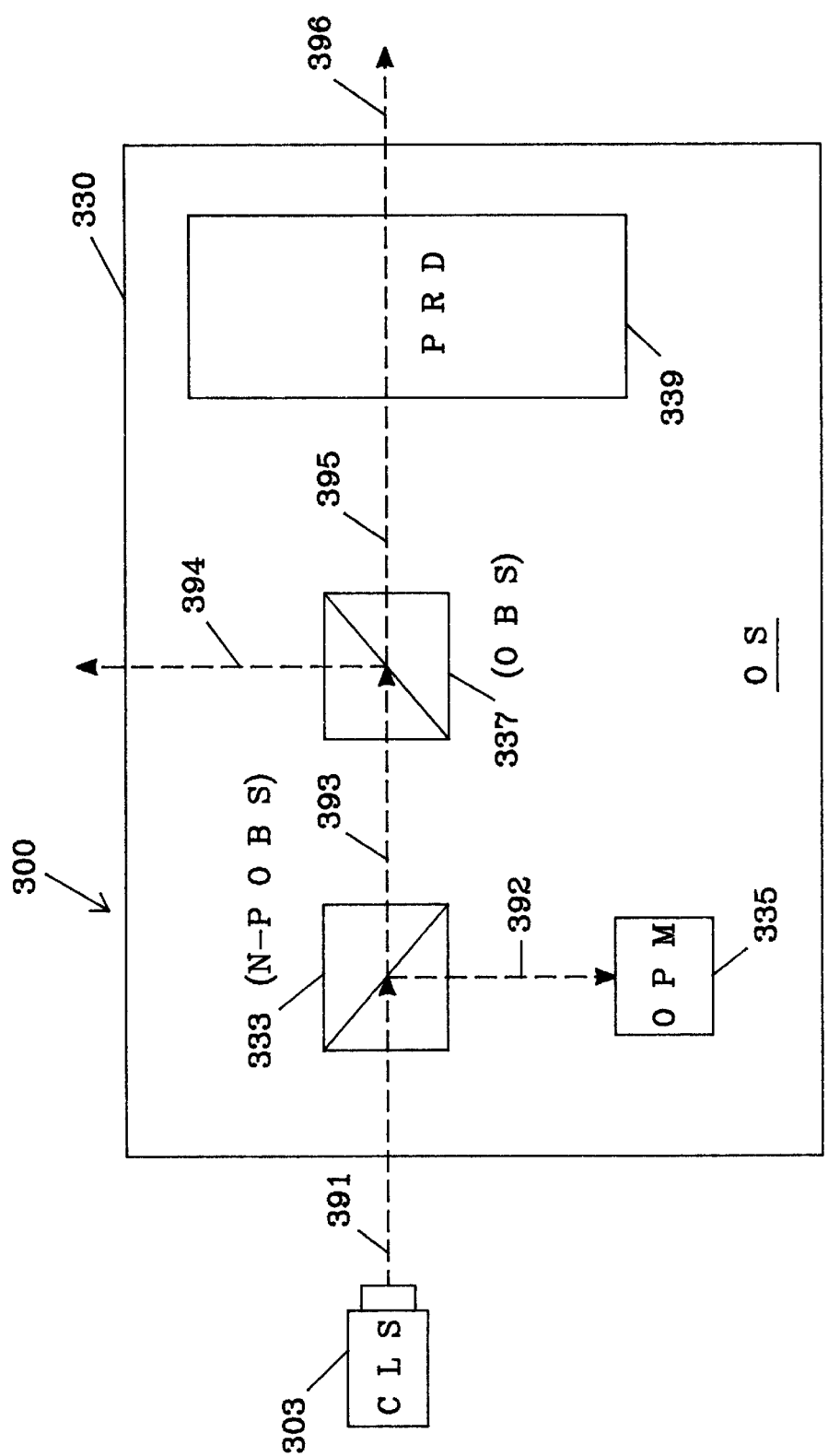
FIG. 3 is a component level view of the linearly X-polarized local oscillator module.

Referring now to FIG. 3, a component level view of the X-polarized signal generating module 300 is presented. Coherent light source 303 (also designated as "CLS") generates linearly Y-polarized light beam 391 with an electric field magnitude larger than $E_{LX}$ and radian frequency of $\omega_{LX}$. Light beam 391 propagates from coherent light source 303 into a non-polarized optical beam splitter 333 (also designated as "N-POBS"). The light beam is split into two fractional light beams 392 and 393. Fractional light beam 392 is propagated to optical power meter 335 (also designated as "OPM"), Optical power meter 335 monitors the power of the optical signal generated by coherent light source 303 and ensures that the amplitude is held stable. Fractional light beam 393 passes into optical beam splitter 337 (also designated as "OBS"). Fractional light beam 393 is split into two portions; light beam 394 propagates from optical beam splitter 337 into local signal phase locking module 500 while light beam 395 propagates into polarization rotation device 339. Polarization rotation device 339 rotates linearly Y-polarized light beam 395 into linearly X-polarized light beam 396. Linearly X-polarized light beam 396 then propagates into incoming receptor module 600 (also designated as "IORM").

Figure 4:
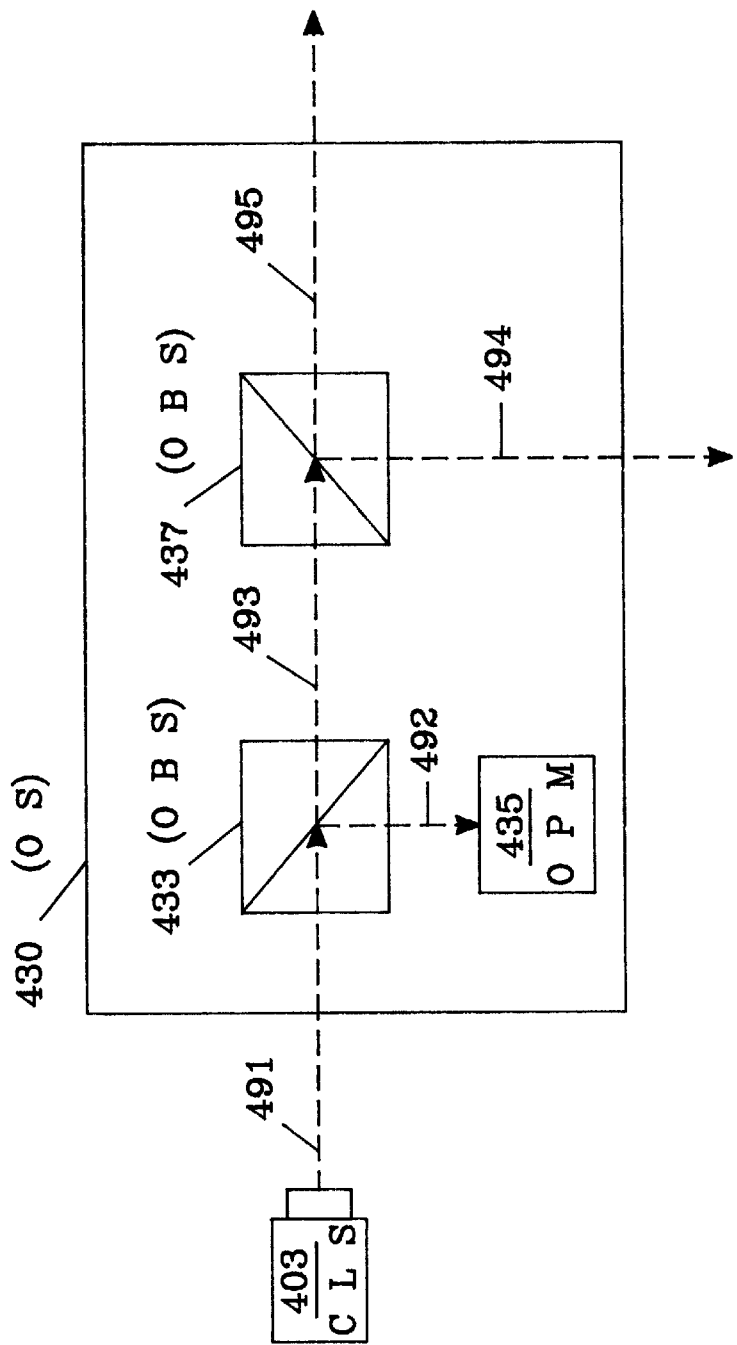
FIG. 4 is a component level view of the linearly Y-polarized local oscillator module.

Referring now to FIG. 4, a component level view of the Y-polarized signal generating module 400 is presented. Coherent light source 403 (also designated as "CLS") generates linearly Y-polarized light beam 491 with an electric field magnitude larger than $E_{LY}$ and radian frequency of $\omega_{LY}$. Light beam 491 propagates from coherent light source 403 into optical beam splitter 433 (also designated as "OBS"). Light beam 491 is split into two fractions. Fractional light beam 492 is propagated to optical power meter 435 (also designated as "OPM"). Optical power meter 435 monitors the power of the optical signal generated by coherent light source 403 and ensures that the amplitude is stable. Fractional light beam 493 passes from optical beam splitter 433 into optical beam splitter 437 (also designated as "OBS"). Fractional light beam 493 is split into two portions; light beam 494 propagates from optical beam splitter 437 into local signal phase locking module 500 while light beam 495 propagates into incoming receiver module 600.

Figure 5:
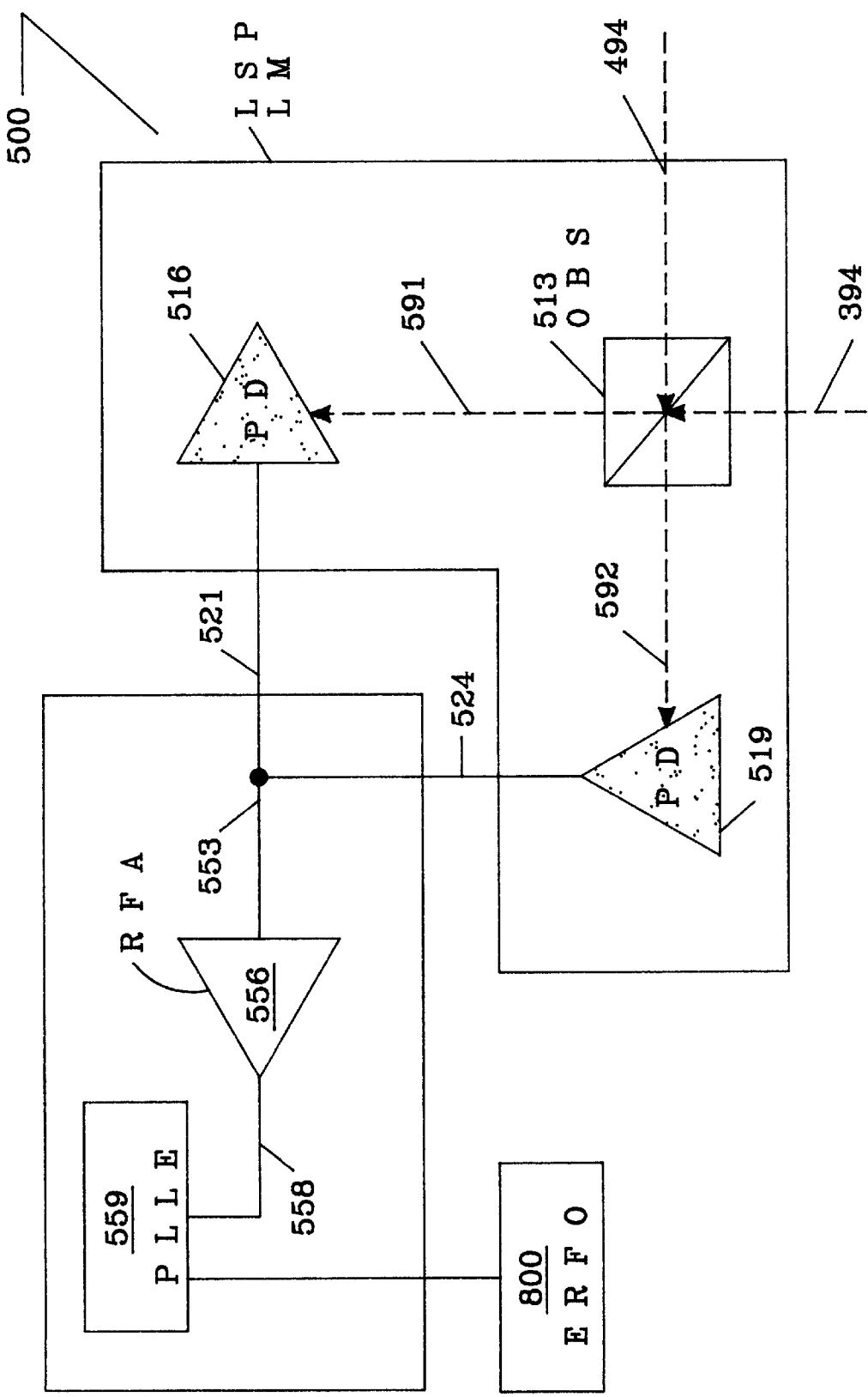
FIG. 5 is a component level view of the local oscillator phase locking module.

Referring now to FIG. 5, a component level view of local signal phase locking module 500 (also designated as "LSPLM") is presented. Incoming linearly Y-polarized light beams 394 and 494 propagate into optical beam splitter 513 (also designated as "OBS") from X-polarized signal generating module 300 and Y-polarized signal generating module 400. Optical beam splitter 513 divides light beams 394 and 494 into half, with approximately half of the power of each propagating on in light beams 591 and 592. Light beams 591 and 592 contain Y-polarized light of two different frequencies, corresponding to the frequencies of light generated in X-polarized light oscillator generating module 300 and Y-polarized local oscillator generating module 400. Light beams 591 and 592 strike photodetectors 516 and 519 (also designated as "PD"). Photodetectors 516 and 519 are closely matched in responsivity. The output from photodetectors 516 and 519 are carried over wires; 521 and 524 to intersection node 553. At intersection node 553, the current generated by photodetectors 516 and 519 is subtracted, yielding a difference in current that is sunk into radio frequency amplifier 556. Radio frequency amplifier 556 generates an electrical voltage wave which has a radian frequency equal to the difference between the frequencies of light beams 394 and 494. This voltage wave is carried by wire 558 to phase-locked loop electronics 559 (also designated as "PLLE"). Phase-locked loop electronics 559 measures the frequency and phase of light beams 394 and 494 and compares it against the reference frequency from electronic radio frequency oscillator 800 in order to control the beat frequency and phase of the coherent light sources.

Figure 6:
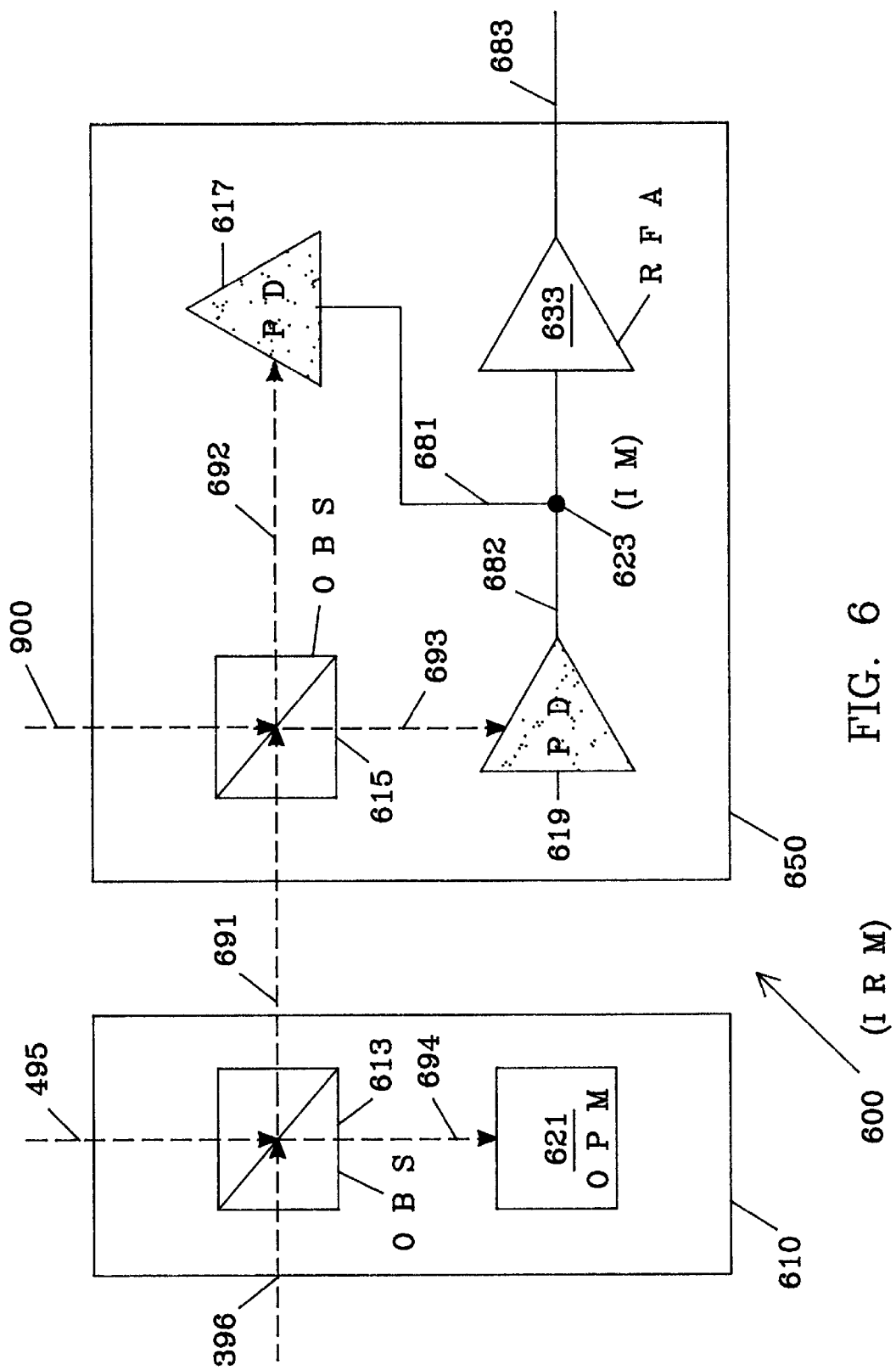
FIG. 6 is a component level view of the optical signal receptor module.

Referring now to FIG. 6, a component level view of incoming receptor module 600 is presented. Linearly X-polarized light beam 396 and linearly Y-polarized light beam 495 propagate into optical beam splitter 613 (also designated as "OBS"). Optical beam splitter 613 divides light beams 396 and 495 into local composite light beams 691 and 694. Local composite light beam 694 propagates to optical power meter 621 (also designated as "OPM"). Optical power meter 621 measures the sum of the power of the two orthogonally polarized light beams 396 and 495. By checking the electrical output at the radian beat frequency $\omega_{LS}-\omega_{LF}$, the system is able to verify that both light beams are present and are orthogonally aligned.

Local composite light beam 691 propagates to optical beam splitter 615 (also designated as "OBS"). External optical signal 1900 is also directed into optical beam splitter 615. Optical beam splitter 615 forms a composite beam comprised of external optical signal 1900, linearly X-polarized light beam 495, and linearly Y-polarized light beam 396, and then splits the formed composite beam precisely in half into composite beams 692 and 693. Composite beams 692 and 693 thus comprise light of three frequencies and polarizations: $\omega_S$ radian frequency and arbitrary unknown polarization from the external source, $\omega_{LX}$ radian frequency and linear X-polarization from light beam 396, and $\omega_{LY}$ radian frequency and linear Y-polarization from light beam 495. Composite beams 692 and 693 strike photodetectors 617 and 619 (also designated as "PD"). Photodetectors 617 and 619 generate current in proportion to the power of the composite beams which is passed through wires 681 and 682 to intersection node 623. At intersection node 623, the two currents generated by photodetectors 617 and 619 are subtracted and the difference is sunk into the input impedance of radio-frequency amplifier 633 (also designated as "RFA") thereby developing a voltage which is amplified and placed on wire 683. This voltage is a composite radio frequency wave which has two components centered at radian frequencies $\omega_S-\omega_{LX}$ and $\omega_S-\omega_{LY}$. These two frequencies correspond to the beat frequencies between linearly Y-polarized light beam 396 and external optical signal 1900 ($\omega_S-\omega_{LS}$) and between linearly X-polarized light beam 495 and external optical signal 1900 ($\Omega_S-\omega_{LY}$) indicate the difference in frequency between the respective optical sources. Furthermore, the magnitude and phase of the components of this composite radio frequency wave provide the four pieces of information required to resolve the phase rate of external optical signal 1900.

Figure 7:
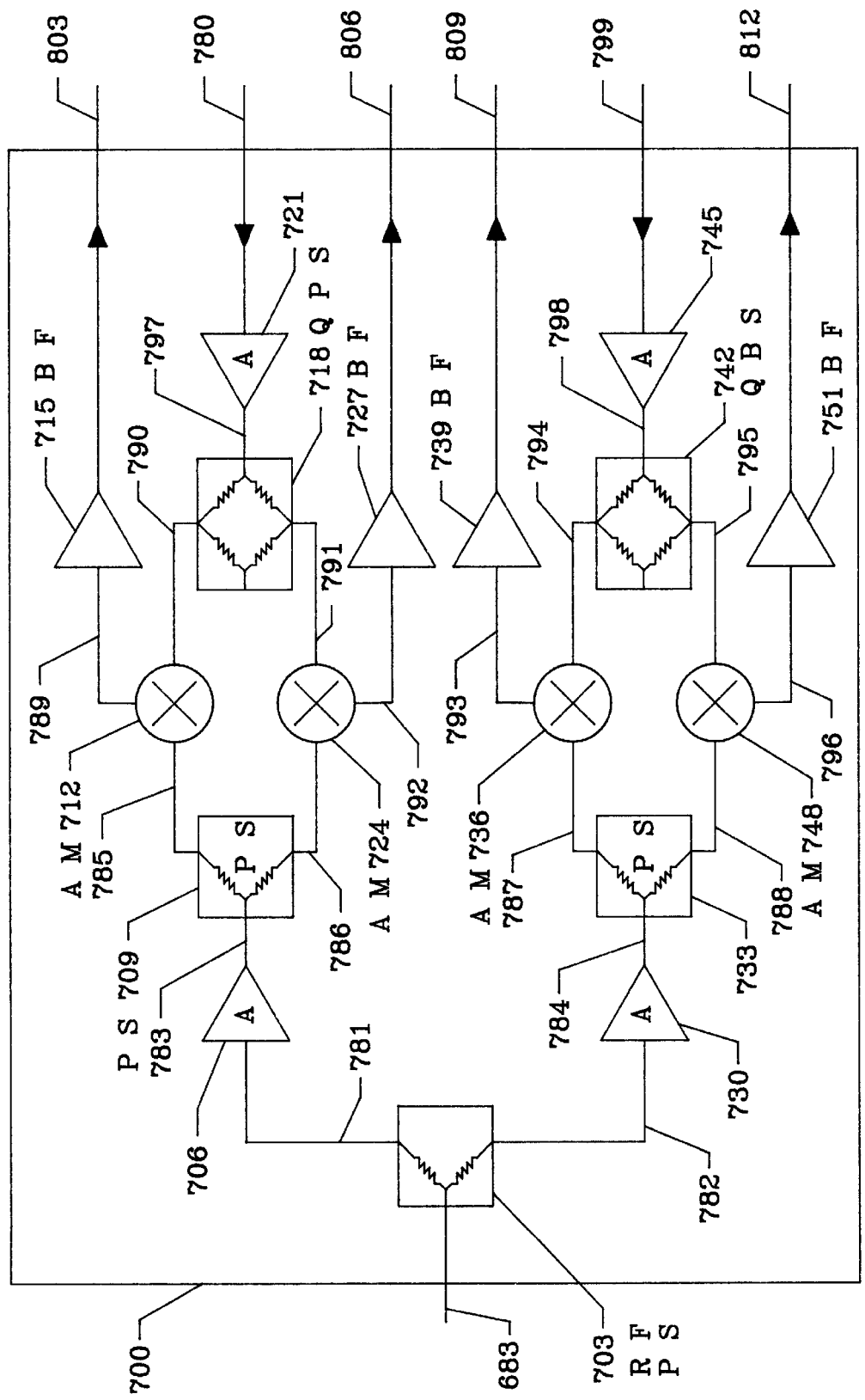
FIG. 7 is a component level view of the signal decoding module.

Referring now to FIG. 7, a component level view of the decoder or an electronic decoding module 700 is shown. Wire 683 carries a composite radio frequency signal to power splitter 703. Power splitter 703 (also designated as "RFPS") divides the input RF signal power equally onto wires' 781 and 782. Wires 781 and 782 carry the diminished signal to amplifiers 706 (also designated as "A") and 730 (also designated as "A") which amplify the signal. The amplified signals are carried by wires 783 and 784 to power splitters 709 (also designated as "PS") and 733. Power splitters 709 and 733 (also designated as "PS") divide the signal into four channels on wires 785, 786, 787, and 788.

Simultaneously, two reference inputs are developed. In particular, a reference RF wave of radian frequency $\Delta\omega_x$ is input on wire 780 to amplifier 721 (also designated as "A"). Amplifier 721 boosts the signal and then passes it along wire 797 to quadrature power splitter 718 (also designated as "PS"). Quadrature power splitter 718 splits the input signal into two parts. The first part is propagated onto wire 790. The second part, after splitting, is phase delayed 270 degrees and then placed on wire 791. Additionally, a reference RF wave of radian frequency $\Delta\omega_Y$ is input on wire 799 to amplifier 745 (also designated as "A"). Amplifier 745 boosts the signal and then passes it along wire 798 to quadrature power splitter 742 (also designated as "PS"). Quadrature power splitter 742 divides the reference signal into two equal parts. The first part is propagated onto wire 794, while the second part, after being phase delayed 270 degrees, is propagated onto wire 795.

Figure 8:
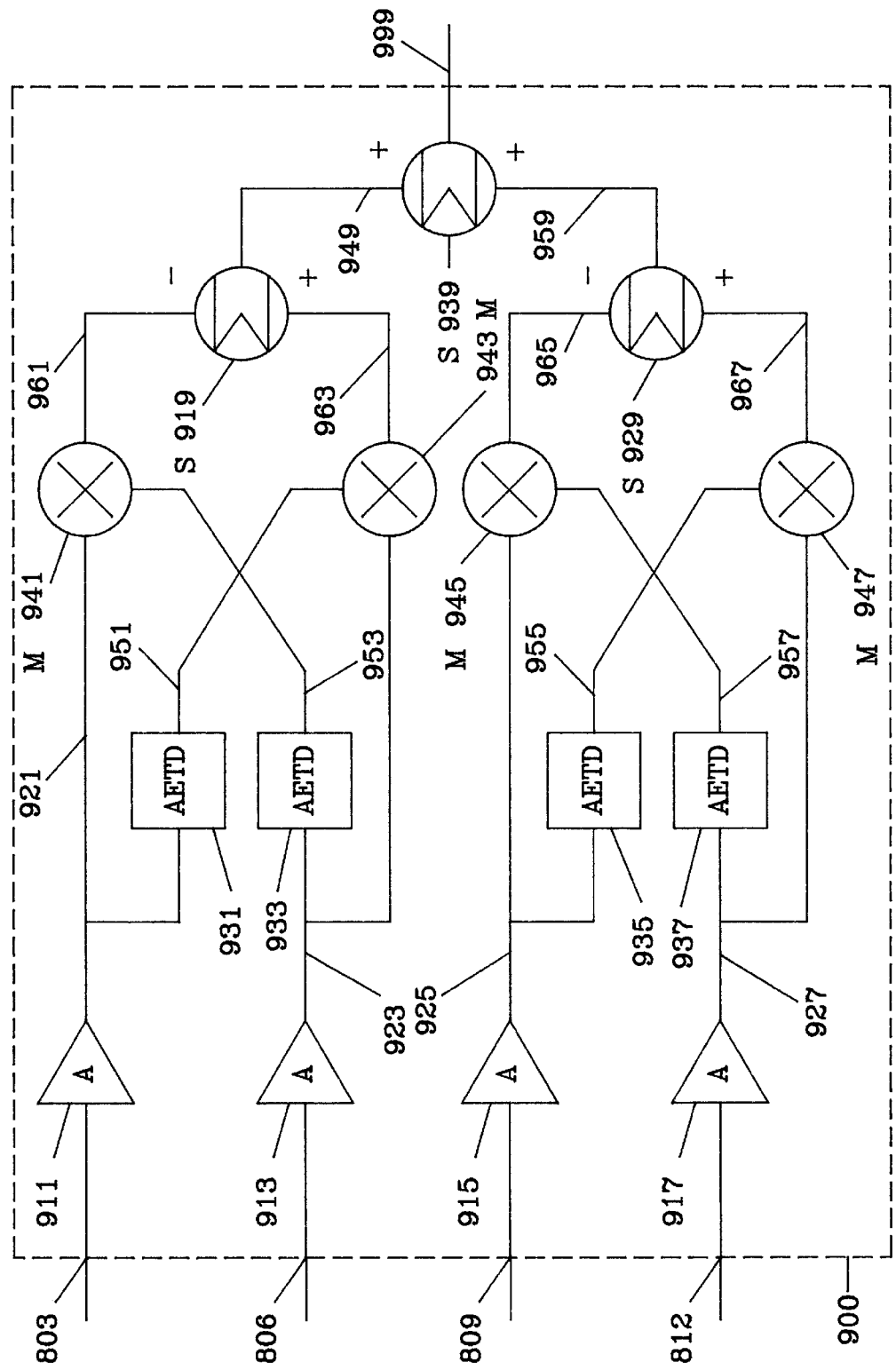
FIG. 8 is a component level view of the differentiation and cross multiplication module.

Analog multiplier 712 (also designated as "AM") multiplies the signal on wires 785 and 790 together and outputs the resulting waveform—the composite wave times cos $(\Delta\omega_x t)$—onto wire 789. Analog multiplier 724 (also designated as "AM") multiplies the signals on wires 786 and 791 together and outputs the resulting waveform—the composite wave times $\sin(\Delta\omega_x t)$—onto wire 792. Analog multiplier 736 multiplies the signals on wires 787 and 794 together and outputs the resulting waveform—the composite wave times $\cos(\Delta\omega_y t)$—onto wire 793. Analog multiplier 748 multiplies the signals on wires 788 and 795 together and outputs the resulting waveform—the composite wave times sin $(\Delta\omega_y t)$—onto wire 796. Finally, wires 789, 792, 793, and 796 deliver their waveforms to amplifier and low band filters 715, 727, 739, and 751. Amplifier and low band filters 715 (also designated as "LBF"), 727 (also designated as "LBF"), 739 (also designated as "LBF"), and 751 (also designated as "LBF") generate the final outputs 803, 806, 809, and 812 which represent $V_{XI}$, $V_{XQ}$, $V_{YI}$, and $V_{YQ}$. The electrical power of the these four final outputs comprise a stabilized output signal which has constant output electrical power for constant optical input power. These outputs provide power proportional to the external optical signal power over all phase and polarization values. Referring now to FIG. 8, a component level view of differentiation and cross multiplication module 900 is shown. Outputs 803, 806, 809, and 812 are provided by electronic decoding module 700 and amplified by amplifiers 911 (also designated as "A"), 913 (also designated as "A"), 915 (also designated as "A"), and 917 resulting in amplified signals 921, 923, 925, and 927. These amplified signals are then differentiated by analog electronic temporal differentiators 931 (also designated as "AETD"), 933 (also designated as "AETD"), 935 (also designated as "AETD") and 937 (also designated as "AETD") forming differentiated outputs 951, 953, 955 and 957 respectively.

Next, the X and Y components are cross multiplied. For the X component, amplified output 921 and differentiated output 953 are connected to multiplier 941 (also designated as "M"), forming multiplied output 961. Amplified output 923 and differentiated output 951 connect to multiplier 943 (also designated as "M") forming multiplied output 963. Multiplied output 961 is next subtracted from output 963 by electronic subtractor 919 (also designated as "ES"), yielding X component synthesized output 949. X component synthesized output 949 corresponds to $V_{XDCM}$.

The operation of the Y component segment is similar. Amplified output 925 and differentiated output 957 are multipliecd. by multiplier 945 forming multiplied output 965. Amplified output 927 and differentiated output 955 are connected to multiplier 947, forming multiplied output 967. Multiplied output 965 is subtracted from multiplied output 967 by electronic subtractor 929 (also designated as "ES") yielding Y component synthesized output 959. Y component synthesized output 959 corresponds to $V_{YDCM}$.

Finally, X component synthesized output 949 and Y component synthesized output 959 are connected to electronic summer 939. Electronic summer 939 (also designated as "ES") adds the two signals and produces composite synthesized output 999 which corresponds to $V_{DCM}$.

The features and advantages of the invention are numerous. The invention allows the fading-free reception of optical phase signals having time varying polarization phase; and frequency. It further allows quantum-limited detection of optical signals having temporal phase and polarization variations. The invention also provides (without requiring electronic signal clipping or other similar techniques) polarization and phase fading-free electronic output power which is directly and constantly proportional to the optical signal input power, thereby causing the receiver to have a constant signal to noise ratio. Further, the invention provides for fading-free reception phase-varied and polarization-varied optical carrier signals.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. An optical device for fading-free reception of optical phase signals comprising:

means for generating a composite local optical signal comprising two phase-locked spatially orthogonal optical signals of different frequencies wherein said composite local optical signal uses first means for generating a first local optical signal having a first distinct frequency and second means for generating a second local optical signal having a second distinct frequency and means for phase locking said first local optical signal and said second local optical signal;

means for receiving an external optical signal;

means for interfering said composite local optical signal with said external optical signal thereby producing a heterodyne interference optically connected to said composite generating means and said optical signal receiving means;

a photodetector optically connected to said interference means for detecting said heterodyne interference and producing a composite radio-frequency wave;

an electronic decoder electronically connected to said photodetector; and an electronic differentiation and cross multiplication module electronically connected to said electronic decoder.

2. An optical device for fading-free reception of optical phase signals as in claim 1 wherein said means for generating a composite local optical signal further comprises a polarization rotation device for rotating the polarization state of said first local optical signal such that said first local optical signal becomes linearly polarized orthogonal to said second local optical signal.

3. An optical device for fading-free reception of optical phase signals as in claim 2 wherein said means for generating a composite local optical signal further comprises a beam splitter for generating said composite local optical signal from equal portions of said first local optical signal and said second local optical signal.

4. An optical device for fading-free reception of optical phase signals as in claim 1 wherein said interfering means is a non-polarized beam splitter producing two output optical signals having equal portions of said composite local optical signal and said external optical signal.

5. An optical device as in claim 1 wherein said electronic decoder has a stabilized output signal which has constant output: electrical power for constant optical input power, providing power proportional to the external optical signal power over all phase, polarization and frequency values.

6. An optical device as in claim 1 wherein said electronic decoder has a stabilized output power which is non-zero for any input signal with a non-zero input power.

7. An optical device as in claim 1 wherein said electronic decoder has a single channel RF input and four output channels.

8. An optical device as in claim 7 wherein said output channels comprise four demodulated voltages corresponding to the components determining the amplitude, power, polarization and phase state of the external optical signal.

9. An optical device as in claim 1 wherein said electronic differentiation and cross multiplication module further comprises two distinct segments, corresponding to the X and Y inputs, and an electronic summer, the outputs of said segments connected to said electronic summer.

10. An optical device as in claim 9 wherein said segments further comprise a plurality of amplifiers, a plurality of temporal differentiators, electronically connected to said amplifiers and said temporal differentiators, and an electronic subtractor connected to said multipliers.

11. A method for fading-free reception of optical phase signals comprising the steps of:

forming a local composite optical signal by generating a first local optical signal having a first distinct frequency and a second local optical signal having a second distinct frequency and locking the phase of said first local optical signal and the phase of second local optical signal such that a constant frequency difference and phase relationship is maintained;

receiving an external optical signal;

combining said local composite optical signal and said external optical signal thereby forming an external composite optical signal;

converting said external composite optical signal into a radio-frequency electronic voltage wave comprising the heterodyne interference products of said local composite signal and said external optical signal;

decoding said radio-frequency electronic voltage wave to produce four output signals; and differentiating and cross multiplying said four output signals to produce a single composite synthesized output signal which represents the phase rate of said external optical signal.

12. A method for fading-free reception of optical phase signals as in claim 11 wherein the steps of forming a composite local optical signal comprises rotating the polarization state of said first local optical signal becomes linearly polarized orthogonal to said second local optical signal.

13. A method for fading-free reception of optical phase signals as in claim 12 wherein the steps of forming a composite local optical signal comprises combining said first local optical signal and said second local optical signal thereby forming a local composite optical signal.

14. A method for fading-free reception of optical phase signals as in claim 11 wherein said step of receiving an external optical signal further comprises the step of receiving an external optical signal of temporally-varying phase, polarization, and frequency.

15. A method for fading-free reception of optical phase signals as in claim 11 wherein said step of differentiating and cross multiplying said four output signals to produce a single composite synthesized output signal representing the phase rate of said external optical signal comprises the step of maintaining a constant signal to noise ratio for all input signals.

* * * * *